July 4, 1967 J. H. CASTOE 3,329,404
VEHICLE AXLE POSITIONING TOOL
Filed Dec. 20, 1966 2 Sheets-Sheet 1
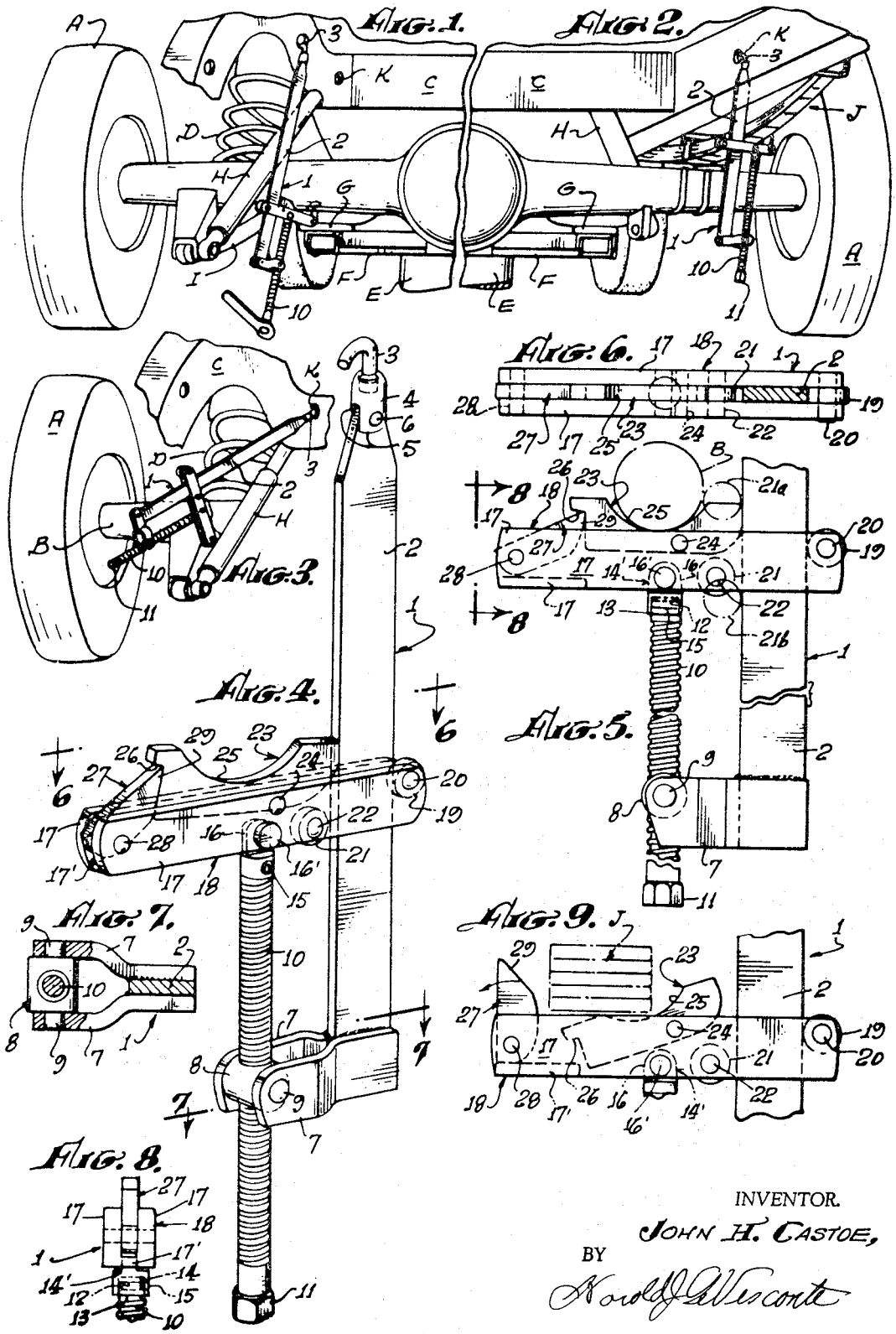
INVENTOR.
JOHN H. CASTOE,
BY
Harold J. Wescott

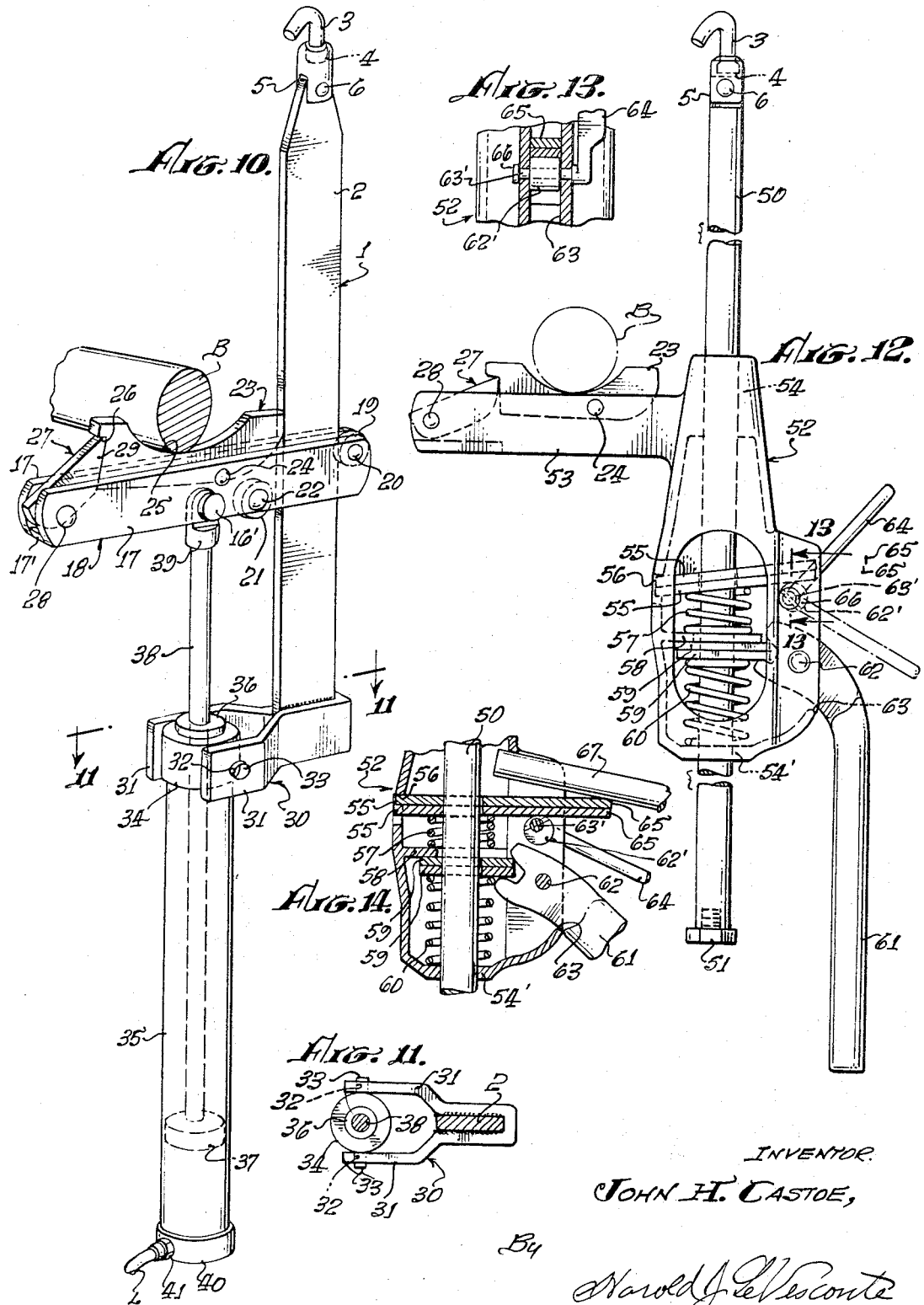

United States Patent Office 3,329,404
Patented July 4, 1967

3,329,404
VEHICLE AXLE POSITIONING TOOL
John H. Castoe, 6718 Shady Grove St.,
Tujunga, Calif. 91042
Filed Dec. 20, 1966, Ser. No. 603,250
9 Claims. (Cl. 254—93)

This invention constitutes a continuation-in-part of my co-pending application Ser. No. 548,684 filed May 9, 1966, and like said co-pending application relates to tools for the repair of automotive vehicles and more particularly to a tool for temporarily positioning the rear axle of a vehicle in a desired predetermined relation to the frame during removal and replacement of shock absorbers, trailing arms or frame supporting springs.

Heretofore in the removal and installation of shock absorbers or trailing arms or frame supporting springs associated with rear axles, it has been the custom to elevate the vehicle on a hoist which engages the vehicle frame and then to place a pair of supporting stands to engage the rear axle housing and lower the hoist sufficiently to allow the weight of the frame and body to compress the springs and release the pressure on the shock absorbers. This produced a pronounced forward tilt of the vehicle on the hoist with danger that the vehicle would slide forward, tipping the supporting stands which held the rear axle housing with the possibility of severe damage to the vehicle from falling off of the hoist and of possible injury to a mechanic working under the vehicle.

The present invention is directed to, and has for its principal objective, the provision of a clamp means adapted to interact between existing locating holes in the vehicle frame members which were employed in the manufacture of the frame and the rear axle or means fixed to the rear axle and which clamp is operable to move the rear axle housing toward the frame and to hold it in such position as will enable the shock absorbers or trailing arms to be removed and reinstalled while maintaining the vehicle in its normal position on the supporting hoist.

Another object of the invention is to provide a clamp of the above character which is capable of use either in engagement with the rear axle housing or with a frame supporting leaf spring carried by the axle housing.

Still another object of the invention is to provide a clamp means of the above character which is useful additionally to exert compressive force between a vehicle rear axle and a vehicle frame in the line of the trailer arms which are associated with coil spring frame suspension and operates to hold the axle and frame in position while the trailer arm is being removed and installed or replaced.

A still further object of the invention is to provide a clamp means of the above character in which the compressive force exerted thereby includes a screw operated means.

Still another object of the invention is to provide a clamp means of the above character in which the compressive force thereof is derived from fluid pressure operated means.

A still further object of the invention is to provide a clamp of the above character in which the compressive force is derived from a manually operable, releasable, step-by-step ratchet means.

Still another object of the invention is to provide a clamp means of the above character which is of simple sturdy construction, is composed of few parts, is susceptible of economical manufacture and which is reliable in use for its intended purpose.

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a fragmentary perspective view of the left hand rear portion of a representative vehicle showing a mode of use of the clamp type of tool comprising the presently preferred embodiment of the invention incident to removing and replacing a shock absorber associated with a coil spring frame suspension means, FIG. 2 is a fragmentary perspective view of the right hand rear portion of the representative vehicle showing the clamp of the present invention as employed for removal and replacement of a shock absorber associated with a leaf type frame suspension spring means, FIG. 3 shows a third mode of use of the clamp of the present invention incident to removal and replacement either of shock absorbers of certain makes of cars for which the mode of use shown in FIG. 1 is impractical or, alternatively, for removing and replacing the trailing arm components which extend between the rear axle housing and the frame of vehicles having coil spring suspension systems, FIG. 4 is a perspective view of the said presently preferred embodiment of the invention arranged for engagement with a rear axle housing, FIG. 5 is a fragmentary side elevation of the said embodiment of the invention employed as generally indicated in FIG. 1, the axle housing being indicated in broken lines, FIGS. 6 and 7 are transverse sectional views taken, respectively, on the lines 6—6 and 7—7 of FIG. 4, FIG. 8 is a fragmentary front elevation of the jaw component of the device as indicated by the line 8—8 of FIG. 5, FIG. 9 is a view similar to FIG. 5 but showing the jaw component of the device arranged for engagement with a leaf spring of a frame suspension means, FIG. 10 is a perspective view of the second embodiment of the invention in which a single action, fluid pressure cylinder and piston is employed as the compressing means, FIG. 11 is a sectional view taken on the line 11—11 to FIG. 10, FIG. 12 is a side elevational view of a third embodiment of the invention in which a friction grip jack mechanism is employed as the compressing means, FIG. 13 is an enlarged, fragmentary sectional view taken on line 13—13 of FIG. 12 showing a locking means, and FIG. 14 is a fragmentary medial longitudinal section of said third embodiment showing the mode of release of the device from operative engagement with a vehicle axis.

Referring to the drawings and particularly to indicate typical modes of use, FIG. 1 shows a fragment of a left hand read end of a motor vehicle including a wheel A supported by an axle contained in a housing B, a frame including a side member C yieldingly supported by a coil spring D, the frame and vehicle being shown as elevated on a hoist E having a plurality of arms F engaging the side frame members of the vehicle at spaced points, said arms each having a frame engaging pad G. A shock absorber H extends between the axle housing and the frame and a rigid trailing arm I extends from the axle housing forwardly to a connection with the frame.

In FIG. 2, the vehicle is shown as being supported on the same type of hoist but the frame is yieldingly supported by a multiple leaf spring J attached to the upper side of the axle housing and the ends of the spring are attached to the frame by the usual spring shackles, the leaf springs in such vehicles serving additionally to impart the driving thrust of the rear wheels to the frame and body of the vehicle or, in other words, to additionally serve the same purpose as the trailing arms in coil spring suspension systems.

In FIG. 3, there is shown another type of coil spring suspension in which the available space does not permit the tool of the present invention to be used in the manner shown in FIG. 1 and in which the illustrated mode of use additionally, permits the frame and rear axle housing to be held in such position that the trailer arm can be removed and replaced. While a hoist is not shown, it will be understood that the vehicle is assumed to be elevated on a hoist as in FIGS. 1 and 2.

The frame side members customarily have holes K extending therethrough on the inner sides thereof, said holes being locating holes employed in the manufacture of the frame to hold the side members in predetermined relation to one another while being secured together by the cross members of the frame structure.

The illustrated embodiment of the tool of the present invention, generally designated as 1, includes a frame member 2 comprising an elongated rectangular bar having a hook 3 freely rotatably mounted at one end thereof, said hook having an enlarged end mounted in a socket member 4 which at the end thereof opposite that from which the hook projects is slotted to form spaced arms 5, 5 which straddle the end of the frame member 2 and are secured to the end of the frame member by a pivot pin 6, the distal end of the frame member serving additionally to maintain the head of the hook seated in the socket.

At its other end, the frame member 2 is provided with a laterally extending bracket means here shown as comprising a pair of arms 7, 7 welded or otherwise united to opposite sides of the frame member with additional ends thereof diverging from each other in mirror image relationship. At their said distal ends, the arms 7, 7 pivotally support a nut element 8 having axially aligned stud portions 9, 9 at the opposite sides thereof engaging complementary bearing holes in the said distal ends of the arms 7, 7, it being noted that securing the arms to the frame member 2 serves, at the same time, to secure the nut 8 in the outer ends of the arms.

The nut 8 is provided with a threaded bore extending therethrough transversely to the axial lines of the stud portions 9, 9 and an elongated jack screw 10 extends through and threadedly engages the threaded bore in the nut, said screw extending generally parallel to the frame member 2. At the end thereof remote from the hook 3, the jack screw 10 is provided with a polygonal head 11 for engagement by a wrench or the like and at its other end, the screw terminates in a short unthreaded portion 12 of a diameter not greater than the root diameter of the threads and said unthreaded portion is provided with a peripheral groove 13, said unthreaded end being freely rotatably received in a socket 14 of a connector 14' and being secured therein with capacity for relative rotation by a set screw 15 which engages the groove 13. The connector 14' terminates at the end opposite the socket 14 in a tongue portion 16 secured by a pivot pin 16' between the side members 17, 17 of the sliding jaw component 18 of the tool, said jaw members projecting laterally from the frame member 1 in the same direction as the bracket means formed by the members 7, 7 and said members 17, 17 being united at their distal ends by being welded or brazed to a spacer member 17' which is of slightly greater thickness than the thickness of the frame member 2.

The jaw side members 17, 17 extend past the rear edge of the frame member and carry a roller 19 supported on an axle pin 20 and disposed between said members so that the roller engages the rear edge of the frame member 2, said roller and axle being disposed at the side of the jaw 18 which is remote from the side thereof engaged by the connector 14'. Also, the said jaw side members carry a second roller 21 mounted on an axle pin 22 and disposed between the members adjacent the opposite edge face of the frame member 2 but spaced from the roller 19 a distance slightly greater than the width of the frame member 2 so that, if required, incident to use, the jaw 18 may tilt between the positions at which the roller 21 may engage the adjacent face of the frame member as illustrated by the circles 21a and 21b in FIG. 5, the pivotal connection of the connector 14' and the pivotal mounting of the nut 8 accommodating such movement of the jaw 18.

Mounted at the edge face of the jaw 18 remote from the jack screw 10 is an axle housing engaging member 23 disposed between the members 17, 17 and pivoted on a supporting pin 24, said member having a concave upper face 25 to accommodate the surface configuration of a rear axle housing at the point thereon to be engaged by said member. The member 23 at the end thereof remote from the frame member 2 is provided with a detent engaging notch 26 and the jaw 18 at its distal end carries a dog 27 mounted on a pivot pin 28 and having a detent end portion 29 adapted to engage the notch 26 when the dog is swung into position in which it rests on the spacer 17' as shown in FIG. 5 thus supporting the member 23 at the upper face of the jaw 18. When the member 23 is not required as will be later explained, the dog 27 is swung outwardly away from engagement with the spacer 17' and the member 23 then may be swung counterclockwise, as viewed in FIG. 9, to a position allowing the upper edges of the members 17, 17 to act at the jaw surface.

As has been previously mentioned, the hoists on which automotive vehicles are serviced engaged the side members of vehicle frames at spaced points between the vehicle wheels and thus when the vehicle is lifted on the hoist, the wheels and axle means stretch away from the frame and body to the extent permitted by the associated shock absorbers or by the springs themselves. As thus extended, the shock absorber or trailer arm cannot be uncoupled from the connection between the rear axle housing and the frame leaving the rear axle unsupported. It is for this reason that the practice of employing supporting stands beneath the rear axle housing and then lowering the hoist to effect compression of the rear frame suspension springs has heretofore been employed.

Next referring to FIG. 1 and assuming that a vehicle having a coil spring suspension means has been lifted on the hoist and that it is desired to change the shock absorber thereon, the jaw 18 of the tool is retracted sufficiently to permit the jaw to be swung under the rear axle housing when the hook 3 thereof is engaged with a suitable one of the locating holes K in the frame member. The screw 10 is then rotated to move the jaw 18 toward the hook end 3 moving the rear axle toward the frame and compressing the coil spring until the shock absorber is free from any stress after which the shock absorber can be removed and replaced or reinstalled with the rear axle constantly being held in the desired predetermined relation to the frame structure. After it has been installed, the clamp device is released.

In FIG. 2 a similar operation is shown as applied to a vehicle having an elliptic multileaf spring rather than a coil spring. In general, the same procedure is followed except that the housing engaging member 23 is released as shown in FIG. 9 so that the jaw 18 engages the flat under surface of the spring. The rear axle housing is drawn toward the frame by the clamp means sufficiently to release the load on the shock absorber so that it can be released and reinstalled or replaced.

In some vehicles, the substantially vertical attitude of the tool for removing the shock absorber is not possible and the tool is engaged with still a different locating hole K in the frame as illustrated in FIG. 3. This same type of use would also be employed for the servicing of the trailing arms which extend between the rear axle housing and the frame of the vehicles having coil spring suspension on the rear axle, the clamp of the present invention serving to hold the rear axle housing in the desired free determined relation to the frame while the trailing arm is removed and reinstalled or replaced.

A further use for the tool has been found on some vehicles in which after the vehicle has been raised on a hoist as shown in FIG. 1, the tool can be employed to hold the rear axle housing in the predetermined position relative to the frame in which, after the shock absorber has been at least released at one end, the rear axle housing can be lowered away from the frame a sufficient distance to allow the coil spring to be removed and replaced after which the rear axle housing can be moved up to a position at which the shock absorber can be reattached.

FIGS. 10 and 11 illustrate a second embodiment of the invention in which the screw means of the first embodiment is supplanted by a single action fluid pressure cylinder and piston means. Accordingly, all components which are identical with those shown in the first described embodiment have been given the same numbers and will not be further described.

In this embodiment, the arms 7, 7 are replaced by a yoke member 30 welded to the end of the frame member 2, said yoke member having spaced parallel arms 31, 31 provided with aligned openings 32, 32 extending therethrough in which diametrically opposed bearing studs 33, 33 of a member 34 forming one end of a hydraulic cylinder 35 are received. The member 34 carries a stuffing box 36 and a piston 37 reciprocable in the cylinder which carries a piston rod 38 which is guided in the stuffing box 36, said piston rod terminating in a head member 39 which, like the connector member 14' of the first embodiment, is received between the side members 17, 17 and is secured therebetween by the pivot pin 16'. The opposite end of the cylinder 35 is closed by an end member 40 provided with a hose connection fitting 41 for connection by a hose L with a source of fluid (preferably hydraulic) pressure. Obviously, as pressure is applied, the piston, piston rod and jaw means 18 will be moved along the frame member 2 toward the hook 3 with resultant positioning of an axle engaged by the jaw in the same manner as by the screw operated means of the first embodiment. Upon completion of the work, the fluid pressure would be released allowing the vehicle spring to cause the axle to move the jaw back to disengaging position. While holding the axle position, the pressure fluid would of course be locked by valve or any other usual means against flowing out of the cylinder and since this involves only ordinary and known procedure, illustration of a specific means therefor is believed to be unnecessary.

FIGS. 12, 13 and 14 illustrate a third embodiment of the invention in which the compressing means employed is a friction type of jack mechanism. Such mechanisms are well known and the particular form here shown, by way of example, is that disclosed in Patent No. 2,227,397 granted Dec. 31, 1940. In this form of the invention, the equivalent of the main frame member 2 comprises a cylindrical rod 50 terminating at one end in a frame engaging hook means like those shown in the preceding embodiments and at its opposite end, the rod carries a screw 51 which constitutes a stop member. Slidably mounted on the rod 50 is a combined housing and jaw member 52 having an integrally formed laterally projecting arm 53 which constitutes the equivalent of the jaw member 17 of the preceding embodiment, said jaw member being bifurcated and carrying the axle housing engaging member 23 pivotally mounted on the pin 24 and the dog 27 mounted on the pivot pin 28. The end of the housing 52 from which the jaw member 53 projects will, for convenience, be designated as the upper end of the housing. The upper end of the housing includes a bearing portion 54 slidably engaging the rod 50 and the lower end of the housing is similarly provided with a bearing portion 54'. Between asid bearings, the housing is hollow and carries the rod engaging means comprising a holding means constituting a pair of washers 55, 55 having one end anchored against an abutment 56 in the housing, said washers having openings therethrough in which the rod 50 is received, and said washers being normally caused to rock about the abutment to the extent permitted by the openings therein by a spring 57 which reacts against a shelf member 58 within the housing. The opposite side of the shelf member 58 serves as an abutment for a pair of actuating clutch washers 59, 59 which are similarly biased by a compression spring 60 reacting against the lower bearing 54'. The operating clutch washers are tilted into and out of clutching engagement with the rod 50 by the bifurcated end of a hand lever 61 which is pivoted on a pin 62 bridging a slot 63 in one side of the housing. Counterclockwise movement of the lever 61 as shown in FIGS. 12 and 14 tends to cant the right hand end of the washers 59 downwardly locking them onto the rod 50 with the result that the housing and jaw are moved upwardly along the rod. During this movement, the washers 59, 59 are being moved downwardly along the rod 50 against the resistance of the spring 60. Clockwise movement of the lever 61 moves the washers up into reengagement with the abutment ledge or shelf 58. Repeated oscillations of the lever 61 will progress the housing and jaw toward the hook positioning the axle. When the desired position has been reached, the device can be locked in position, if desired, by an eccentric cam 62' carried on a shaft 63' formed as an extension of a lever arm 64, the cam being disposed in the slot to the side of the housing 52 through which the lever 61 extends and in which shank ends 65 of the washers 55 extend. Any appropriate means of securing the shaft in its bearings in the portions of the housing forming the sides of the slot may be employed such as riveting the end thereof as at 66.

When it is desired to release the jack from axle holding position, a bar 67 may be inserted in the upper end of the slot as shown in FIG. 14 and urged downwardly toward washers 55, 55 to release their grip on the rod 50 allowing the force of the vehicle spring acting on the axle to move the housing and jaw as a unit along the rod away from the hook 3 to a point at which the device can be disengaged from the vehicle.

While in the foregoing specification has described certain presently preferred embodiments of the invention, such disclosure has been by way of example and that it is not to be assumed that the invention is limited to the precise details of construction so disclosed, wherefore, it will be understood that the invention includes as well all such changes and modifications in the parts and in the construction, combination and arrangement of parts as shall come within the purview of the appended claims.

I claim:

1. An axle positioning tool for use in removing and replacing shock absorbers and trailing arms associated with the rear axle means of motor vehicles; said tool comprising in combination, an elongated, rigid main frame member carrying hook means adjacent one end thereof for effecting detachable engagement of said end of said frame member with a selected one of a plurality of holes occurring in the vehicle frame structure, a jaw component slidably mounted on said main frame member, means permitting relative tilting movement between said main frame member and said jaw component, and means extending between said main frame member and said jaw component operative to move said jaw component along said main frame member toward said hook means, the side of said jaw component adjacent to said hook means including devices optionally adapting said side of said jaw component for engagement with a rear axle housing or with a spring means fixed to the rear axle housing of a vehicle.

2. A tool as claimed in claim 1 including means permitting rotational movement between said main frame member and said hook comprising a socket on said main frame member in which said hook means is rotatable.

3. A tool as claimed in claim 1 in which said frame member includes oppositely disposed, parallel edge surfaces, in which said jaw component is tiltable on said frame member and carries roller means engaging said frame member edge surfaces effective both to reduce frictional resistance to said sliding movement of said jaw component on said main frame member and to limit the extent to which said jaw component may tilt.

4. A tool as claimed in claim 1 in which said jaw component carries a pivotally mounted member at the side thereof adjacent to said hook presenting a concave surface for engagement with a rear axle housing adjacent the end of the housing and further carries a latch member operative to support said pivotally mounted member in housing engaging position, said pivotally mounted member, in the absence of support by said latch member being displaceable to allow said jaw component to present a flat face for engagement with a leaf spring structure attached to a rear axle housing.

5. A tool as claimed in claim 1 in which said means for moving said jaw component along said frame member comprises a jack screw means.

6. A tool as claimed in claim 1 in which said means for moving said jaw component along said frame member comprises a fluid pressure cylinder mounted on said frame member and having a piston carrying a piston rod, and in which said piston rod is connected to said jaw component.

7. A tool as claimed in claim 1 in which said means for moving said jaw component along said frame member includes a friction type jack mechanism with which said jaw component is integrally formed.

8. A tool as claimed in claim 5 in which said jack screw means includes a threaded member having an end thereof rotatably engaged in a socket means laterally offset from and pivotally connected to said jaw component and in which said frame member carries a laterally extending arm carrying a pivotally mounted nut through which said threaded member extends.

9. A tool as claimed in claim 7 in which said friction jack mechanism includes cam means operable to releasably lock said jack mechanism and jaw component against movement thereof away from said hook.

References Cited
UNITED STATES PATENTS 1,955,630  4/1934  Hall _____ 29—256
2,014,535  9/1935  Maca _____ 29—256

OTHELL M. SIMPSON, *Primary Examiner.*